April 11, 1961 G. A. LYON 2,979,168
BRAKE DRUM COOLING RING STRUCTURE
Filed April 4, 1958 2 Sheets-Sheet 1

Inventor
George Albert Lyon

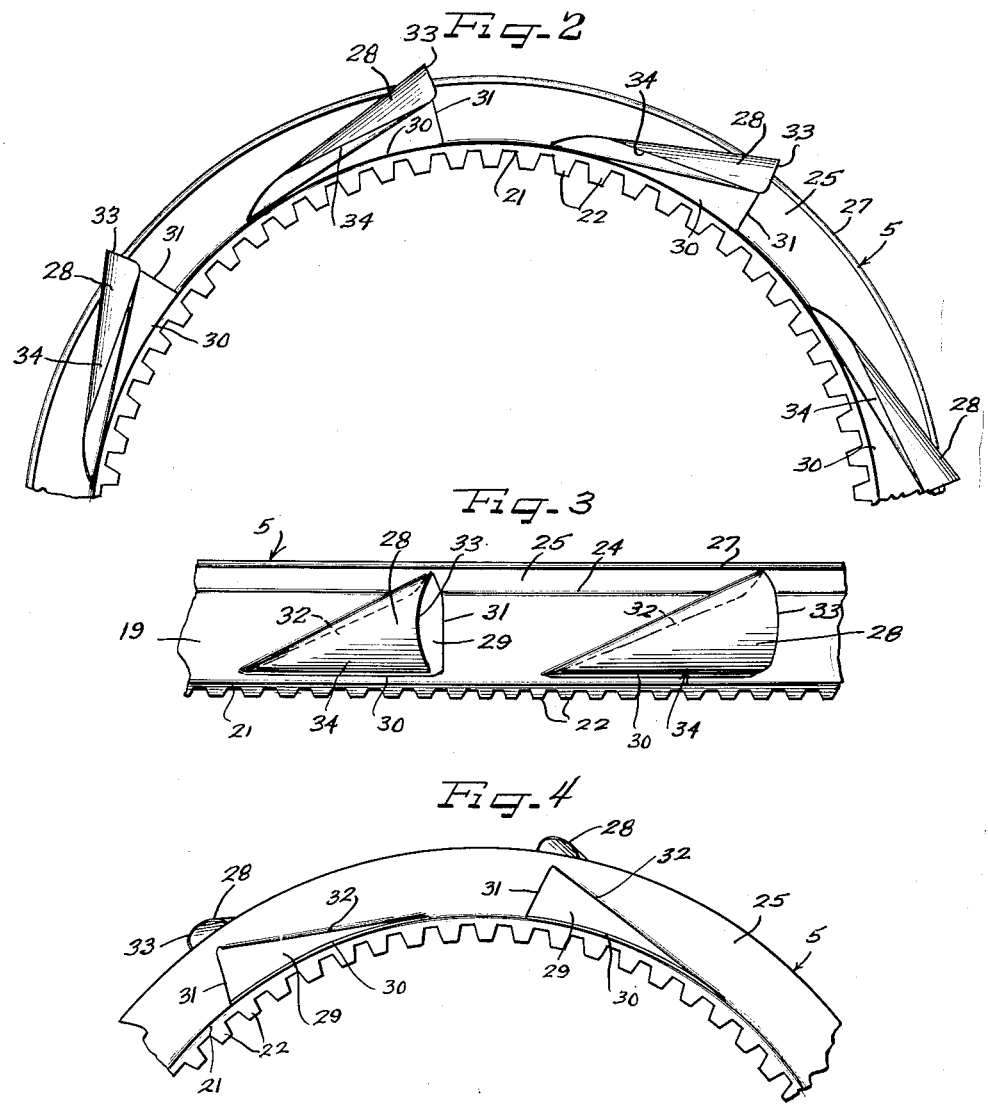

United States Patent Office 2,979,168
Patented Apr. 11, 1961

2,979,168

BRAKE DRUM COOLING RING STRUCTURE

George Albert Lyon, 13881 W. Chicago Blvd., Detroit 28, Mich.

Filed Apr. 4, 1958, Ser. No. 726,408

6 Claims. (Cl. 188—264)

The present invention relates to improvements in means for cooling vehicle wheels and more particularly the brake drums of such wheels.

Higher automotive vehicle speeds, greater engine power and increased vehicle weight require larger, more powerful brakes and result in greater braking energy and consequent heating of the brake drums. Overheating of the brakes is highly undesirable because of the accelerated deterioration of the friction materials used in the brake linings, as well as accelerated wear of other components of the brake system.

An important object of the present invention is to provide improved means for association with the brake drums of automotive vehicles for promoting the circulation of cooling air over and about the brake drum.

Another object of the invention is to provide an improved ring structure adapted to be assembled optionally with the brake drum of a vehicle for effecting cooling air circulation over the brake drum in the running of the wheel.

A further object of the invention is to provide a brake drum cooling ring which is adapted for easy assembly with the brake drum and is effectively held in position on the brake drum both against axial and rotary displacement.

Still another object of the invention is to provide an improved brake drum cooling ring which is adapted to be made of sheet or strip material by economical mass production methods of manufacture so as to be supplied at low costs.

Yet another object of the invention is to provide a brake drum cooling ring which is so constructed and arranged that on the forward side of the wheel in running the cooling ring draws in and deflects air into cooling circulation to the brake drum and on the rear side of the wheel in running enables escape of heated air.

Other objects, features and advantages of the present invention will be readily apparent from the following detailed description of a preferred embodiment thereof taken in conjunction with the accompanying drawings, in which:

Figure 2 is a fragmentary axially outer side elevational view of the cooling ring;

Figure 3 is a fragmentary radially outer edge elevational view of the cooling ring; and Figure 4 is a fragmentary axially inner side elevational view of the cooling ring.

Figure 1:
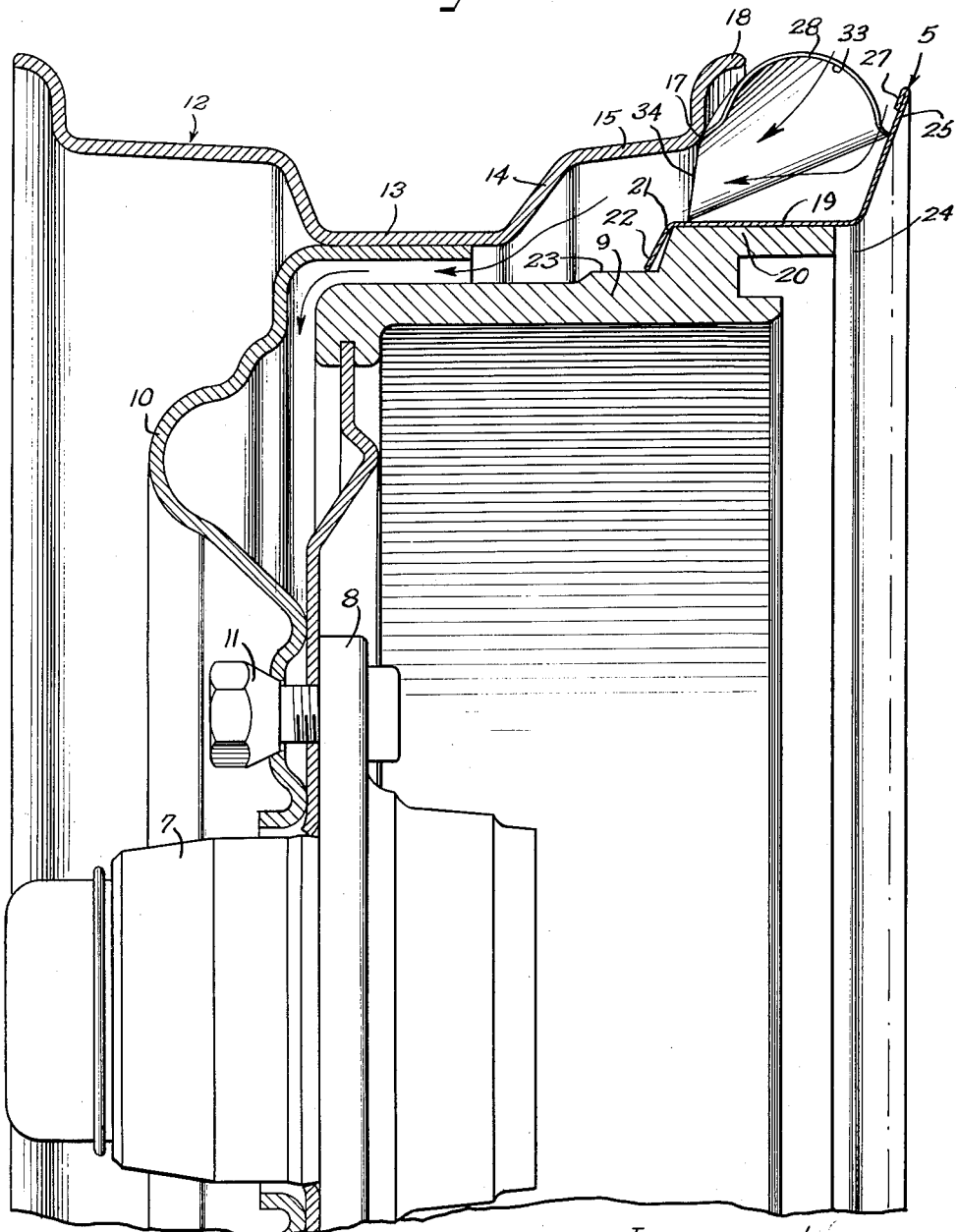
Figure 1 is a fragmentary sectional elevational view through a wheel structure including a cooling ring according to the present invention.

Having reference to Figure 1, a cooling ring 5 embodying features of the invention is shown as mounted on a vehicle wheel assembly such as an automobile wheel and including a hub 7 adapted to be supported on an axle (not shown) and having the usual lateral flange 8 to which a brake drum 9 is attached. Also attached to the flange 8 is a wheel including a disk spider body 10 with the usual central bolt-on flange removably attachable by means of attachment bolts 11. Carried by the wheel body 10 is a tire rim 12 of the multi-flange, drop center type having a base flange 13 which is suitably secured to the usual marginal attachment flange of the wheel body 10. At the axially inner side of the wheel, the tire rim includes a side flange 14 that diverges generally radially outwardly and axially inwardly from the base flange 13 and joins an intermediate generally axially outwardly extending flange 15 merging on a juncture shoulder 17 with an inner terminal flange 18. It will be observed that the tire rim and more particularly the axially inner portion of the tire rim encompasses most of the brake drum 9 in annular gap relation and that the axially outer end of the between rim and drum gap joins a generally radial gap between the wheel body 10 and the forward wall of the brake drum.

The cooling ring 5 is constructed and arranged to divert and direct cooling air into the between rim and drum gap during the forward and rotary movements of the wheel in running with the associated vehicle. To this end, the ring 5 is constructed of suitable sheet or strip material such as stainless steel, brass, aluminum, or other suitable sheet material in one piece ring form including a generally axially extending annular body 19 of a diameter to extend telescopically about a generally rib-like larger diameter axially inner marginal portion 20 of the brake drum. At its axially outer end, the ring body 19 has a narrow generally radially inwardly and axially outwardly oblique narrow shoulder stop flange 21 provided with a circumferential set of generally radially inwardly and axially outwardly projecting retaining teeth 22. At their tips, the fingers 22 are substantially sharp so as to engage in retaining biting relation against an annular radially outwardly facing surface 23 on the external face of the brake drum 9 axially outwardly adjacent to the enlarged diameter shoulder portion 20 and relative to which annular surface 23 the tips of the fingers 22 normally project to a slightly smaller diameter. Through this arrangement, the cooling ring 5 is adapted to be applied to the brake drum before the wheel is assembled with the axle by axially rearwardly sliding the ring body 19 into position about the shoulder rib 20 until the stop flange 21 engages the axially outwardly facing shoulder portion of the shoulder rib 20 to define the axially inward disposition of the cooling ring. In so doing, the retaining fingers engage in biting retaining engagement with the annular surface 23. Since there are a large number of the fingers 22, each of which has a pair of oppositely extending corners on the tip thereof, it will be appreciated that the ring will be held quite effectively against relative rotation or, stated another way, the ring will be held effectively corotatively with the brake drum, as well as against axial displacement.

At its axially inner margin, which in the assembly with the wheel assembly extends axially inwardly beyond the tip of the adjacent terminal flange 18 of the tire rim, the ring 5 has projecting generally radially outwardly and axially inwardly from a reinforcing juncture bend 24 with the body 19 a continuous annular air scoop deflector flange 25 the free extremity of which is turned under to provide a reinforcing and finishing flange 27.

While the ring member 5 would be reasonably effective merely as a cooling air deflector to divert air into the between tire rim and brake drum gap by action of the deflector flange 25 on the slipstream air in the forward movement of the associated wheel, substantially improved efficiency and increased cooling air volume and accelerated cooling air circulation is attained by the provision of a circumferentially spaced series of air scoops 28 arranged to project into the space between the deflector flange 25 and the tire rim terminal flange 18 and operative to scoop air in the rotary movement of the ring 5 with the wheel and drive the scooped air generally axially forwardly into the between rim and brake drum gap and in cooling circulation over the brake drum. In a convenient and efficient form, the air scoops 28 are struck directly from the material of both the ring body 19 and the deflector flange 25 as best seen in Figures 2–4. Accordingly, the material for each of the air scoops 28 is derived from a generally triangular opening 29 having a long edge 30 in the axially outer portion of the ring body 19 adjacent to but preferably spaced slightly from the juncture with the narrow flange 21 and running generally parallel thereto. A shorter edge 31 is located to extend from the rotationally forward end of the edge 30 and extends preferably slightly diagonally rotationally rearwardly and axially rearwardly through the body 19, across the juncture rib 24 and across the radially inner potion of the deflector flange 25 to a point short of the adjacent edge of the underturned reinforcing flange 27. The hypotenuse of the generally triangular opening from which the material for the scoop 28 is derived provides an integral juncture 32 for the scoop and runs across both the body 19 and the flange 25 from the axially innermost extremity of the edge 31 to the rotationally rearmost extremity of the edge 30. Through his arrangement, the rotationally forwardmost portions of the air scoops 28 contain the major amount of material in the generally triangular bodies of the scoops which are formed up to provide a generally transversely arcuate shape as shown to afford a large scoop mouth 33 directed in the direction of rotation of the ring and as best seen in Figures 1, 2 and 4 projecting preferably radially outwardly beyond the edge of the deflector flange 25.

It will be observed that the scoops are of generally semi-cone shape from the mouth ends 33 thereof to the trailing ends thereof and with the trailing ends adjacent to the shoulder flange 21 whereby air scooped in by the air scoops is directed generally axially outwardly into the between rim and drum gap. In addition, each of the scoops is provided with an axially outer edge 34 which is arranged generally to oppose the shoulder 17 of the tire rim under preferably slight resilient tension by crowding of the scoops against the shoulder 17 for anti-rattle, sound deadening or damping purposes.

In operation, in the forward movement of the wheel, that is, the direction in which the wheel travels with the associated vehicle, the scoops 28 together with the deflector flange 25 scoop and move air into the gap between the tire rim and the brake drum in cooling sweeping circulation over the brake drum and then into the space between the brake drum and the wheel body 10. It will be appreciated that this action is quite effective on the forward and downwardly moving portion of the rotating wheel since in the rotary and forward movement of the wheel the forward and downwardly moving portion, as is well known, travels at a high rate of speed. On the other hand, on the returning and upwardly moving rear portion of the wheel the relative rate of motion in each revolution of the wheel is slower. Therefore, the air that is scooped in and circulated from the front of the traveling wheel through the spaces between the tire rim and the wheel body and the brake drum can move or crowd toward the rear side of the wheel and there move out or escape past the cooling ring 5. In so doing, air from the slipstream may move through the apertures 29 with somewhat of an aspirating effect to assist evacuation of heated air from the rear portion of the between rim and drum space at any given time. The efficiency of the instant ring is therefore high and especially desirable with a wheel wherein no circulation openings are provided between the wheel body and the tire rim but cooling air must be effective entirely at the axially inner side of the wheel.

It will be appreciated, of course, that the ring 5 will be provided in left and right pairs wherein the scoops 28 are oriented respectively for forward scooping movement in the rotation of the respective wheels.

It will be understood that modifications and variations may be effected without departing from the scope of the novel concepts of the present invention.

I claim as my invention:

1. In a wheel structure including a brake drum and a wheel having a tire rim generally encompassing the brake drum in gap relation at the axially inner side of the wheel, a cooling ring member having a generally axially extending annular body portion about the axially inner margin of the brake drum and a free edge generally radially outwardly extending annular scoop flange disposed axially inwardly relative to the tire rim and defining therewith an annular scoop-in mouth for scooping air into the gap incident to forward rotary movement of the wheel.

2. In a wheel structure including a brake drum and a wheel having a tire rim generally encompassing the brake dum in gap relation at the axially inner side of the wheel, a cooling ring member having a generally axially extending annular body portion about the axially inner margin of the brake drum and a free edge generally radially outwardly extending annular scoop flange disposed axially inwardly relative to the tire rim and defining therewith an annular scoop-in mouth for scooping air into the gap incident to forward rotary movement of the wheel, said ring having on the tire rim opposing sides of the body and scoop flange a circumferentially spaced series of air scoops with the mouth ends thereof directed in the direction of rotation of the wheel and the trailing ends thereof angled toward gap between the tire rim and the brake drum to deflect air into the gap.

3. In a brake drum cooling ring, a generally axially extending annular body having a generally radially outwardly and axially inwardly oblique annular scoop flange with its edge and adjacent margin free through out its annular extent for air scooping function, said scoop flange and said body jointly carrying thereon scoop members having mouths that are spaced from said edge and open in one rotary direction and trailing ends that angle toward the axially outer margin of the body, and means carried by the body for retaining engagement with a brake drum.

4. In a brake drum cooling ring structure, an annular generally axially extending sheet metal ring body having an axially inner margin that projects generally radially to define an annular scoop flange, said body and said scoop flange having struck therefrom and across the joint thereof respective generally triangular apertures with the hypotenuse of the triangle extending across both the flange and the body and having bent therefrom the material struck from the apertures and such material being in the form of air scoops, and means carried by the ring body for retaining engagement with a brake drum.

5. In a brake drum cooling ring structure, an annular generally axially extending sheet metal ring body having an axially inner margin that projects generally radially to define an annular scoop flange, said body and said scoop flange having struck therefrom and across the joint thereof respective generally triangular apertures with the hypotenuse of the triangle extending across both the flange and the body and having bent therefrom the material struck from the apertures and such material being in the form of air scoops, said air scoops being of semi-cone shape with the apices thereof adjacent to the axially outer margin of the ring body, and means carried by the ring body for retaining engagement with a brake drum.

6. In a wheel structure including a tire rim and a brake drum substantially encompassed by the tire rim and providing therewith an air circulation gap at the axially inner side of the wheel, an air circulation promoting ring member encircling the axially inner portion of the brake drum and projecting axially inwardly therebeyond and having a generally radially outwardly projecting annular scoop flange in axially inwardly spaced relation to the tire rim so as to provide therewith an annular scoop mouth through which air is scooped into said gap, said scoop flange having a circumferentially spaced series of air scoops struck therefrom and projecting toward the tire rim and operative in the forward and rotary movement of the wheel to scoop air through said mouth and into said gap for circulation about the brake drum, said air scoops affording openings through the scoop flange where the scoops have been struck therefrom and through which openings slipstream air can move in aspirating relation at the rear of the wheel in the forward movement of the wheel to assist in evacuating heated air from the space between the wheel and the brake drum.

References Cited in the file of this patent

UNITED STATES PATENTS

| | | |
|---|---|---|
| 2,659,460 | Lyon | Nov. 17, 1953 |
| 2,759,572 | Lyon | Aug. 21, 1956 |
| 2,781,874 | Gaylord | Feb. 19, 1957 |
| 2,808,908 | Lyon | Oct. 8, 1957 |
| 2,809,318 | Lyon | Oct. 8, 1957 |